United States Patent [19]

Hansen

[11] 4,104,323

[45] Aug. 1, 1978

[54] ADHESIVE COMPOSITION CONTAINING A PRE-BLENDED POLYPHENYLENE ETHER RESIN

[75] Inventor: David R. Hansen, Houston, Tex.

[73] Assignee: Shell Oil Company, Houston, Tex.

[21] Appl. No.: 788,186

[22] Filed: Apr. 18, 1977

[51] Int. Cl.$^2$ .................. C08L 45/00; C08L 53/00
[52] U.S. Cl. ......................... 260/829; 260/876 B
[58] Field of Search ......................... 260/876 B, 829

[56] References Cited

U.S. PATENT DOCUMENTS

| | | | |
|---|---|---|---|
| 3,239,478 | 3/1966 | Harlan | 260/876 B |
| 3,639,499 | 2/1972 | Snodgrass | 260/829 |
| 3,639,506 | 2/1972 | Haaf | 260/876 R |
| 3,639,508 | 2/1972 | Kambour | 260/876 B |
| 3,686,107 | 8/1972 | Russell | 260/876 B |
| 3,835,200 | 9/1974 | Lee | 260/876 B |
| 3,887,646 | 6/1975 | Yonemitsu | 260/876 B |
| 3,887,647 | 6/1975 | Yonemitsu | 260/876 B |
| 3,917,607 | 11/1975 | Crossland | 260/876 B |
| 3,920,770 | 11/1975 | Nakashio | 260/876 B |
| 3,923,722 | 12/1975 | Lakshmanan | 260/829 |
| 3,963,804 | 6/1976 | Yonemitsu | 260/829 |
| 3,987,002 | 10/1976 | Lakshmanan | 260/829 |
| 4,002,701 | 1/1977 | Katchman | 260/876 B |

*Primary Examiner*—Paul Lieberman
*Attorney, Agent, or Firm*—Dean F. Vance

[57] ABSTRACT

An adhesive composition and process for making the same are disclosed wherein the adhesive composition has greatly improved high temperature properties. The adhesive composition is prepared by first melt blending a polyphenylene ether resin and a low molecular weight resin, and then blending the resulting mixture with a monoalkenyl arene/conjugated diene block copolymer, tackifying resin, and optional hydrocarbon processing oil.

9 Claims, No Drawings

ADHESIVE COMPOSITION CONTAINING A PRE-BLENDED POLYPHENYLENE ETHER RESIN

BACKGROUND OF THE INVENTION

Styrene-diene block copolymers have been formulated in the past to produce a number of types of adhesive compositions. The basic patent in this field, Harlan, U.S. Pat. No. 3,239,478, shows combinations of these block copolymers with tackifying resins and paraffinic extending oils to produce a wide spectrum of adhesives. However, one of the serious limitations of these adhesive compositions is their relatively low service temperatures. Generally, the highest temperature at which these styrene-diene block copolymers retain useful properties and act like a vulcanized rubber is limited by the softening temperature (Tg) of the styrene end block. Depending upon the molecular weight of the end blocks and the load, these block copolymers can begin to significantly creep or flow at 120°–180° F. For a number of applications it would be very advantageous to have higher service temperatures. For example, these adhesives would be useful in paint shops if the masking tapes produced had a 225°–250° F service temperature.

One means to improve the service temperature of these styrene-diene block copolymers is to mechanically mix a resin with the block copolymer which will increase the softening temperature of the styrene end blocks. However, the resins now currently available for this purpose are limited to service temperature increases of only about 30° F or less at 30 phr (parts per hundred rubber) loading.

One possible resin not previously disclosed for use in adhesive compositions is a polyphenylene ether resin. These polyphenylene ethers are well known and are described in numerous publications including Hay, U.S. Pat. Nos. 3,306,874 and 3,306,875, and Stamatoff, U.S. Pat. Nos. 3,257,357 and 3,257,358. These polymers are high performance engineering thermoplastics having high molecular weights and possessing high melt viscosities and softening points — i.e., Tg equals 210° C, $>10^4$ poise at 315° C. However, the relatively high melt viscosities and softening points are a serious disadvantage in blending with the subject styrene-diene block copolymers. While it has been shown that blends containing the polyphenylene ether resins can be prepared using solution techniques, melt processing before this has been commercially unattractive because of the high temperature required to soften the resin and the problems associated therewith such as instability and discoloration. Specifically, the subject styrene-diene block copolymers are unstable and cross link at the 275° C temperature required for direct melt blending with the commercially available polyphenylene ether resins.

It is known in the art that properties of the polyphenylene ether resins can be materially altered by blending them with other resins. For example, one method for improving the melt processability of the polyphenylene ethers is disclosed in U.S. Pat. No. 3,379,792. According to this patent, flow properties of the polyphenylene ethers are improved by blending with from about 0.1 to 25 parts by weight of a polyamide. In another patent, U.S. Pat. No. 3,361,851, a polyphenylene ether composition comprising a polyphenylene ether blended with a polyolefin is disclosed. The polyolefin is added to improve impact strength and resistance to aggressive solvents. In a third patent, Cizek, U.S. Pat. No. 3,383,435, there are provided means for simultaneously improving the melt processability of the polyphenylene ether resins while simultaneously up-grading many properties of the polystyrene homopolymer and random copolymer resins. The invention of the Cizek patent is based upon the discovery that the polyphenylene ether resins and such polystyrene resins, including rubber modified polystyrene resins, are combinable in all proportions and result in compositions having many properties improved over those of either of the components. However, the polystyrene resins of Cizek having high molecular weight are incompatible with the end blocks of the subject styrene-diene block copolymers.

In Kambour, U.S. Pat. No. 3,639,508, "liquid phase blending" of a polyphenylene ether resin and a monovinyl aromatic-diene block copolymer is disclosed. Liquid phase blending is defined to include both solution blending and melt blending. However, this melt blending according to Kambour is effective at temperatures of 100° C over the glass transition temperature of the polyphenylene ether resin or, more particularly, over a range of 275° C to 310° C. As noted above, these melt blending temperatures are typically above the gelling temperature of the styrene-diene block copolymer. Such gelling can be tolerated when the styrene-diene block copolymer is only an impact modifier, a minor component. However, when the styrene-diene rubber is the major component, gelling dramatically decreases the properties of the blend. Accordingly, in all examples of Kambour employing a styrene-diene block copolymer, only solution blending was employed. See also U.S. Pat. Nos. 3,663,661; 3,835,200; and 3,994,856, which teach that high temperature melt blending has many disadvantages.

Other blending schemes, such as that disclosed in Lauchlan et al., U.S. Pat. No. 3,660,531, also have their built-in disadvantages due to the necessary presence of a high molecular styrene resin.

A new melt blending process has been discovered that permits the melt blending of a polyphenylene ether resin and a styrene-diene block copolymer without the use of a solvent and at temperatures that do not result in damage to the block copolymer. Further, novel adhesive compositions have been discovered that possess improved high temperature performance characteristics.

SUMMARY OF THE INVENTION

A melt blending process for preparing a polymer composition with high temperature performance characteristics is disclosed, which process comprises:

(a) melt blending a low molecular weight polyphenylene ether resin and a block A compatible resin selected from the group consisting of coumaroneindene resins, vinyl toluene-alphamethylstyrene copolymers, and mixtures thereof at a temperature of preferably 30° C greater than the softening point of the polyphenylene ether resin in a weight ratio of polyphenylene ether resin to block A compatible resin of between about 1:10 and about 10:1, wherein the molecular weight ($M_{vis}$) of the polyphenylene ether resin is between about 6,000 and about 25,000, and the glass transition temperature of the block A compatible resin is between about 40° C and about 100° C, thereby forming a polyphenylene ether resin alloy; and (b) melt blending about 1 to about 100 parts by weight of said polyphenylene ether resin alloy with 100 parts by weight of a block copolymer at a temperature below about 230° C, said block copolymer having at least two monoalkenyl arene polymer end blocks A and at least one elastomeric conjugated-diene mid-block B, said blocks A comprising 8-55% by weight of the block copolymer.

By employing the present process to melt blend the polyphenylene ether resin and the styrene-diene block copolymer, it is possible to avoid the use of solvents while also avoiding the degradation of the block copolymer. The resulting polymer blend not only possesses a much higher service temperature, but is surprisingly stable against oxidative degradation over a long period of time.

The present invention also encompasses an adhesive composition that employs this polyphenylene oxide alloy. The adhesive composition is a hot melt adhesive, as opposed to a solvent-applied adhesive, and comprises:

(a) 100 parts by weight of a block copolymer having at least two monoalkenyl arene polymer end blocks A and at least one elastomeric conjugated-diene mid-block B, said blocks A comprising 8-55% by weight of the block copolymer;

(b) about 50 to about 200 parts by weight of a tackifying resin compatible with block B;

(c) about 0 to about 200 parts by weight of a hydrocarbon extending oil; and (d) about 1 to about 100 parts by weight of a melt blend of:

(i) a low molecular weight polyphenylene ether resin, and (ii) a block A compatible resin selected from the group consisting of coumarone-indene resins, vinyl toluene-alphamethylstyrene copolymers, and mixtures thereof, wherein the weight ratio of the polyphenylene ether resin to the block A compatible resin is between about 10:1 and about 1:10, the molecular weight ($M_{vis}$) of the polyphenylene ether resin is between about 6,000 and about 25,000; and the glass transition temperature of the block A compatible resin is between about 40° C and about 100° C.

Adhesive compositions prepared according to this invention possess service temperatures significantly higher than the similar prior art adhesives not containing the melt blend of polyphenylene ether resin and block A compatible resin. It has also been found that the selection of the particular low molecular weight polyphenylene ether resin is much preferred over the commercially available higher molecular weight resin, contrary to the expected result. Since the higher molecular weight polyphenylene ether resin has a higher softening temperature than the corresponding lower molecular weight resin, one would expect that adhesive compositions containing the higher molecular weight resin would have higher service temperature than would adhesive compositions containing the lower molecular weight resin. However, it has surprisingly been found that the opposite is true — the adhesives containing the lower molecular weight resin have the higher service temperatures.

DETAILED DESCRIPTION OF THE INVENTION

The process scheme herein contemplated comprises first melt blending the polyphenylene ether resin with a block A compatible resin. The polyphenylene ether resins are those having repeating structural units of the formula

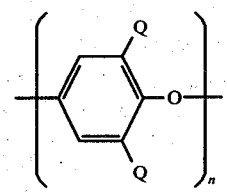

wherein the oxygen ether atom of one unit is connected to the benzene nucleus of the next adjoining unit, $n$ is a positive integer, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the above mentioned patents of Hay and Stamatoff. Especially preferred polyphenylene ether resins for purposes of the present invention are those having alkyl substitution in the two positions ortho to the oxygen ether atom — i.e., where each Q is alkyl, most preferably, having from 1 to 4 carbon atoms. The most preferred polyphenylene ether resin for purposes of the present invention is poly(2,6-dimethyl-1,4-phenylene)ether (each Q is methyl). The molecular weight ($M_{vis}$) of the polyphenylene ether resin is between about 6,000 and about 25,000, preferably about 12,000. The softening point (Tg) of the ether resin is between about 170° C and about 205° C, preferably less than about 200° C. The molecular weight ($M_{vis}$) of the polyphenylene ether is determined by intrinsic viscosity measurements in chloroform, and is calculated using the equation $[\eta] = KM_{vis}^{a}$ where "$n$" is the limiting viscosity number and "K" and "$a$" are Mark Howkin constants equal to 4.83 × $10^{-4}$ and 0.64 respectively.

The block A compatible resins are selected from the group consisting of coumarone-indene resins, vinyl toluene-alphamethylstyrene resins, and mixtures thereof. These resins have glass transition temperatures of between about 40° C and about 100° C, preferably between about 45° C and about 90° C.

The coumarone-indene resins have been commercial materials since before 1920, and are well known items of commerce. The resin formers occur in the light and heavy oils recovered in the coking of coal, and are named from coumarone

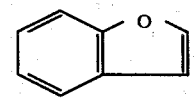

and indene

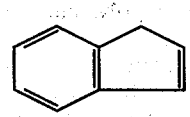

although coumarone typically is only a minor component of the resin formers (probably less than 10%). Other monomers are present with the coumarone and indene such as cyclopentadiene and dicyclopentadiene. The resin formers are then polymerized according to known techniques to form the coumarone-indene resins. See generally, Kirk-Othmer Encyclopedia of Science and Technology, Volume 11, Second Ed. pages 242–248 (1966). The preferred commercial coumarone-indene resins are available from Neville Chemical Company under the tradename CUMAR ® LX-509 resin.

The vinyl toluene-alphamethylstyrene copolymers are also well known resins. These copolymers are typically prepared from pure monomer streams of vinyl toluene and alphamethylstyrene in molar ratios of 1:10 to 10:1. Commercial vinyl toluene-alphamethylstyrene copolymers are available from Hercules Chemical Company under the tradename PICCOTEX ® resin. The preferred resin is PICCOTEX ® 120.

The weight ratio of polyphenylene ether resin to block A compatible resin should be between about 1:10 and about 10:1, preferably between about 1:6 and about 1:1. Very high polyphenylene ether resin quantities in the alloy are not preferred since this may result in poor mixes.

The temperature for melt blending of the polyphenylene ether resin and the block A compatible resin is typically about 30° C above the softening point of the polyphenylene ether resin, preferably between about 230° C and about 260° C. The resulting modified polyphenylene ether resin mixture or alloy possesses a lower viscosity and softening temperature than the pure polyphenylene ether resin. In addition, the alloy is very compatible with the monoalkenyl arene (styrene) end blocks of the block copolymer.

The polyphenylene ether resin alloy is then melt blended with the monoalkenyl arene-diene block copolymer at a temperature below 230° C, preferably between about 150° C and about 200° C. The temperature of mixing can be critical to ensure adequate dispersion of the polyphenylene ether resin in the A blocks of the block copolymer. Accordingly, it is often desirable to increase the mixing temperature until adequate dispersion is obtained, but this mixing temperature should never exceed 230° C.

The amount of polyphenylene ether resin alloy employed is between about 1 and about 100 phr (parts by weight per hundred parts by weight rubber, or block copolymer as in this case), preferably between about 5 and about 50 phr.

The block copolymers employed in the present composition are thermoplastic elastomers and have at least two monoalkenyl arene polymer end blocks A and at least one elastomeric conjugated diene polymer mid block B. The number of blocks in the block copolymer is not of special importance and the macromolecular configuration may be linear, graft or radial depending upon the method by which the block copolymer is formed. Typical block copolymers of the most simple configuration would have the structure polystyrene-polyisoprene-polystyrene and polystyrene-polybutadiene-polystyrene. A typical radial polymer would comprise one in which the diene block has three or more branches, the tip of each branch being connected to a polystyrene block. Expressed another way, the invention contemplates (but is not limited to) the use of configurations such as A—B $+$B—A$)_n$ where $n$ varies from 1 to 20, preferably from 1 to 3. Other useful monoalkenyl arenes from which the thermoplastic (not-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene. A much preferred conjugated diene is isoprene.

The average molecular weights of each of the blocks may be varied as desired. The monoalkenyl arene polymer blocks preferably have average molecular weights between about 5,000 and 125,000, more preferably between about 9,000 and about 25,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromotography, whereas the polystyrene content of the polymer is measured by infrared spectroscopy of the finished block polymer. The weight percentage of the thermoplastic monoalkenyl arene blocks in the finished block polymer should be between about 8 and 55%, preferably between about 10% and about 30% by weight. The general type and preparation of these block copolymers are described in U.S. Pat. Re. 28,246 and in many other U.S. and foreign patents.

The adhesive compositions of this invention are prepared by melt blending the block copolymers with the polyphenylene ether resin alloy, a tackifying resin, hydrocarbon extending oil, and other optional ingredients.

The block copolymer by itself is not tacky or sticky. Therefore, it is necessary to add a tackifying resin that is compatible with the elastomeric conjugated diene block. A much preferred tackifying resin is a diene-olefin copolymer of piperylene and 2-methyl-2-butene having a softening point of about 95° C. This resin is available commercially from Goodyear Chemical Company under the tradename WINGTACK ® 95, and is prepared by the cationic polymerization of 60% piperylene, 10% isoprene, 5% cyclopentadiene, 15% 2-methyl butene and about 10% dimer. See South African Pat. No. 700,881. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C and about 115° C. Other tackifying resins which are also useful in the compositions of this invention include hydrogenated resins, esters of resin, polyterpenes, terpenephenol resins, and polymerized mixed olefins.

The amount of tackifying resin employed varies from about 50 to about 200 parts per hundred rubber (phr), preferably, between about 50 and about 150 phr.

The hydrocarbon rubber extending oil, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, Nos. 310, 371 and 311. The amount of extending oil employed varies from about 0 to 200 phr, preferably from about 0 to about 100 phr.

The adhesive compositions of this invention may be modified with supplementary materials including pigments, fillers, and the like as well as stabilizers and oxidation inhibitors.

The hot melt adhesives of this invention are preferably used in the preparation of pressure-sensitive adhesive tapes by a method such as that disclosed in U.S. Pat. No. 3,676,202. These tapes are preferably used where high service temperatures are required.

The invention is further illustrated by means of the following illustrative embodiments, which are given for the purpose of illustration alone and are not meant to limit the invention to the particular reactants and amounts disclosed.

In the embodiments and examples the following materials were employed:

(1) Block copolymer I; a styrene-butadiene-styrene ABA block copolymer having block molecular weights of about 10,000-52,000-10,000.

(2) Block copolymer II; a styrene-isoprene-styrene ABA block copolymer having block molecular weights of about 10,000-125,000-10,000.

(3) CUMAR LX-509; a coumarone-indene resin from Neville Chemical Company having a Ring & Ball softening temperature of about 155° C and a glass transition temperature (Tg) determined by thermal expansion of about 88° C.

(4) PICCOTEX 120; a poly(alphamethylstyrene-co-vinyltoluene) resin from Hercules Chemical Company having a Ring and Ball softening temperature of 120° C and a Tg of about 49° C.

(5) PPO-H; pure poly(2,6 dimethylphenylene oxide) (PPO) produced by General Electric having a molecular weight ($M_{vis}$) of about 44,000-52,000; a weight average molecular weight ($M_w$) of about 50,000, and a number average molecular weight ($M_n$) of about 20,000. The Tg is 210° C.

(6) PPO-L; pure poly (2,6 dimethylphenylene oxide) (PPO) produced by General Electric having a molecular weight ($M_{vis}$) of about 10,400 and a Tg of about 195° C.

(7) PPO-534; blend of PPO-H and approximately 10-25% high impact polystyrene, filler, flow promoters and stabilizers.

(8) NORYL 731; blend of high impact polystyrene and about 30-50% PPO-H, probably closer to 50% PPO-H. This blend also contains fillers, flow promoters, and stabilizers.

(9) Wingtack 95; a diene-olefin tackifier resin from Goodyear Chemical Company.

(10) SHELLFLEX 371; a hydrocarbon rubber extending oil from Shell Chemical Company.

(11) Kaydel; a paraffinic/naphthenic oil from Witco Chemical Company. (12) Butazate; zinc dibutyldithiocarbamate.

(13) DLTDP; dilaurylthiodipropionate.

(14) Irganox 1010; an antioxidant from Ciba Geigy, covered by U.S. Pat. Nos. 3,285,855 and 3,644,482.

The adhesive compositions were evaluated by a number of tests including Shore A Hardness (Test No. D-2240) a modified Heat Distortion Temperature test (HDT), and Shear Adhesion Failure Temperature test (SAFT).

The heat distortion temperature of the polymer blends was measured with die D tensile bars (ASTM D-412) cut from plaques 0.07 inches thick, compression molded at 1000 psi. A molding temperature of 140° C was used. The samples were subjected to a 110 psi tensile load (engineering stress) in a temperature chamber in which the temperature increased at the rate of 40° F per hour. The heat distortion temperature was taken to be the temperature at which the sample elongated 0.5 inches (ca. 30% elongation assuming all of the elongation takes place in the narrowest section of the tensile bar). Zero elongation was measured at room temperature with the load on the sample.

The service temperature of the mechanically mixed adhesives was measured by using a shear adhesion failure test (SAFT). This test consisted of finding the temperature at which a 1 × 1 inch lap shear joint failed with a 1 kg load. The lap shear joints were prepared by compression molding at 140° C the adhesive formulation between two sheets of 1 mil mylar with a 1.5 mil aluminum foil shim. The shim regulated the adhesive thickness (usually 2 – 3 ml) and also masked the appropriate area for the 1 inch square lap joint. The excess mylar was trimmed away and the aluminum foil removed to leave the appropriate size specimen. The lap shear joint with a 1 kg load was placed in an oven in which the temperature was increased at the rate of 40° F/hr. The SAFT temperature was taken to be the temperature at which the joint failed.

In the comparative examples and embodiments in Tables 1 and 2, all materials processed on a Brabender mixer contained 0.5 phr dilaurylthiodipropionate and 0.5 phr Irganox 1010.

ILLUSTRATIVE EMBODIMENT I

In illustrative Embodiment I the properties of block copolymer I blended with two end block resins and blends of these resins with PPO-L are examined. The results are presented in Table 1. Run 1 shows the properties of the block copolymer before processing. In runs 2-11 the block copolymer and the resins were mixed in a Brabender mixer (roller type head — 50 RPM) for 5-10 minutes at the temperatures shown in Table 1. The alloys of PPO-L and the end block resin were prepared by mixing in a Brabender mixer at 100 RPM and 250° C for 15 minutes.

From the results in Table 1, it can be seen that the heat distortion temperature of the block copolymers was significantly increased. The alloys of PPO-L and block A - compatible resins increased the HDT by 80°-89° F. It was noted the mixing temperatures can have a large effect on the HDT. For the 50/50 LX-509/PPO-L alloy temperatures as high as 180° C had to be employed to achieve optimum HDT. The PICCOTEX-120 alloys, however, because of the lower softening temperature could be incorporated at lower temperatures.

TABLE 1

| | | | BLENDS OF BLOCK COPOLYMER I AND PPO-L ALLOYS | | | | |
|---|---|---|---|---|---|---|---|
| Run No. | Block Copolymer | Alloy or Resin | Alloy Ratio | phr of Alloy or Resin | HDT (° F at 110 psi) | ΔHDT (° F) | Mixing Temperature |
| 1 | I | — | — | 0 | 120 | 0 | Crumb (not processed) |
| 2 | I | — | — | 0 | 118 | −2 | 150 |
| 3 | I | LX-509 | — | 35 | 160 | 40 | 150 |

TABLE 1-continued

| | | BLENDS OF BLOCK COPOLYMER I AND PPO-L ALLOYS | | | | | |
|---|---|---|---|---|---|---|---|
| Run No. | Block Copolymer | Alloy or Resin | Alloy Ratio | phr of Alloy or Resin | HDT (° F at 110 psi) | ΔHDT (° F) | Mixing Temperature |
| 4 | I | PICCOTEX-120 | — | 35 | 128 | 8 | 160 |
| 5 | I | LX-509/PPO-L | 75/25 | 17 | 140 | 20 | 155 |
| 6 | I | LX-509/PPO-L | 75/25 | 35 | 190 | 70 | 150 |
| 7 | I | LX-509/PPO-L | 50/50 | 35 | 118 | −2 | 160 |
| 8 | I | LX-509/PPO-L | 50/50 | 35 | 175 | 55 | 175 |
| 9 | I | LX-509/PPO-L | 50/50 | 35 | 209 | 89 | 180 |
| 10 | I | PICCOTEX-120/PPO-L | 75/25 | 35 | 164 | 44 | 170 |
| 11 | I | PICCOTEX-120/PPO-L | 50/50 | 35 | 200 | 80 | 160 |

COMPARATIVE EXAMPLE I

In this example the end block compatible resins PICCOTEX-120 and LX-509 were alloyed with resins containing the higher molecular weight PPO (PPO-534, NORYL 731, and PPH-H). Direct mechanical mixing of the end block resin and the PPO resins was difficult because of the high viscosity of the PPO. These resins were, therefore, first solution mixed, dried, and then mechanically mixed in a Brabender at 210°–250° C and 100 RPM for 10–15 minutes. Blending of the alloys with block copolymer I was done in the same manner as described in Illustrative Embodiment I.

The results in Table 2 show that the HDT's are inferior to the PPO-L alloys. The presence of high molecular weight high impact polystyrene which is incompatible with the end block of the block copolymer significantly detracts from the HDT as is manifested by run 15. In addition to the deleterious effects of the high impact polystyrene the high viscosity of the PPO also appears to detract from the HDT.

ILLUSTRATIVE EMBODIMENT II

In Illustrative Embodiment II various adhesive compositions were prepared employing block copolymer II. The results are presented below in Table 3. In Runs 18–21, all of the block A compatible resin and PPO-L (if they were part of the formulation) plus enough Wingtack 95 to make a total of 310 grams were mixed by preheating for 5 to 10 minutes in a Baker Perkin Sigma Blade mixer. An equal amount of the block copolymer was then added to the mixer. After 20–25 minutes of mixing under a nitrogen blanket, the oil and remaining Wingtack 95 was added, and mixing was continued for another 10 minutes.

Since melt temperatures of only 160–170 could be obtained in the Baker Perkin mixer, a Brabender sigma blade mixer was employed in the remaining runs. The procedure was the same as that employed in Runs 18–21.

The best SAFT temperature obtained (Run 29) was 56° F better than the formulation with no block A compatible resin (Run 18) and 29° F better than the adhesive with LX-509 at comparable concentrations (Run 28). Again it can be seen that temperature is very important in achieving the optimum properties.

TABLE 2

| | | BLENDS OF BLOCK COPOLYMER I AND HIGH MOLECULAR WEIGHT PPO RESINS | | | | | |
|---|---|---|---|---|---|---|---|
| Run No. | Block Copolymer | Alloy or Resin | Alloy Ratio | phr | HDT (° F at 110 psi) | ΔHDT (° F) | Mixing Temperature (° F) |
| 12 | I | LX-509/PPO-534 | 75/25 | 35 | 153 | 33 | 160 |
| 13 | I | LX-509/PPO-534 | 50/50 | 35 | 165 | 45 | 170 |
| 14 | I | LX-509/PPO-H | 75/25 | 35 | 156 | 36 | 160 |
| 15 | I | LX-509/NORYL 731 | 50/50 | 35 | 127 | 7 | 150 |
| 16 | I | PICCOTEX-120/PPO-534 | 75/25 | 35 | 142 | 22 | 155 |
| 17 | I | PICCOTEX-120/PPO-534 | 50/50 | 35 | 154 | 34 | 160 |

TABLE 3

| Run No. | 18 | 19 | 20 | 21 | 22 | 23 | 24 | 25 | 26 | 27 | 28 | 29 | 30 |
|---|---|---|---|---|---|---|---|---|---|---|---|---|---|
| Block Copolymer II | 100 | 100 | 100 | 100 | 100 | 100 | 100 | 100 | 100 | 100 | 100 | 100 | 100 |
| SHELLFLEX 371 | 25 | 25 | 25 | 25 | | | | | | | | | |
| KAYDOL | | | | | 25 | 25 | 25 | 25 | 25 | 25 | 25 | 25 | |
| LX-509 | | 25 | | | | 25 | | | | | 35 | | |
| LX-509/PPO-L (75/25) | | | 25 | | | | 25 | | | | | 35 | |
| LX-509/PPO-L (65/35) | | | | | | | | 25 | | | | | 35 |
| LM-509/PPO-L (50/50) | | | | 25 | | | | | 25 | | | | |
| PICCOTEX-120/PPO-L (50/50) | | | | | | | | | | 25 | | | |
| WINYACK 95 | 125 | 125 | 125 | 125 | 125 | 125 | 125 | 125 | 125 | 125 | 125 | 125 | 125 |
| Butazate | 5 | 5 | 5 | 5 | 5 | 5 | 5 | 5 | 5 | 5 | 5 | 5 | 5 |

TABLE 3-continued

| Run No. | 18 | 19 | 20 | 21 | 22 | 23 | 24 | 25 | 26 | 27 | 28 | 29 | 30 |
|---|---|---|---|---|---|---|---|---|---|---|---|---|---|
| Mixing Temperature (° C) | 150 | 150 | 150 | 160–170 | 175–180 | 175–180 | 175–180 | 175–180 | 175–180 | 175–180 | 175–180 | 175–180 | 175–180 |
| SAFT (° F) | 186 | 207 | 196 | —* | 186 | 210 | 225 | 229 | 185 | 206 | 213 | 242 | 222 |

*PPO-L alloy did not disperse.

What is claimed is:

1. A hot melt adhesive composition comprising:
   (a) 100 parts by weight of a block copolymer having at least two monoalkenyl arene polymer end blocks A and at least one elastomeric conjugated-diene midblock B, said blocks A comprising 8 – 55% by weight of the block copolymer;
   (b) about 50 to about 200 parts by weight of a tackifying resin compatible with block B;
   (c) about 0 to about 200 parts by weight of a hydrocarbon extending oil; and
   (d) about 5 to about 50 parts by weight of a melt blend of
      (i) a low molecular weight polyphenylene ether resin, and
      (ii) a block A compatible resin selected from the group consisting of coumarone-indene resins, vinyltoluene-alphamethyl-styrene copolymers and mixtures thereof, wherein the weight ratio of the polyphenylene ether resin to the block A compatible resin is between about 1:1 and about 1:6, the molecular weight ($M_{vis}$) of the polyphenylene ether resin is between about 6,000 and about 25,000, the glass transition temperature of the polyphenylene ether resin is between 170° C and 205° C; and the glass transition temperature of the block A compatible resin is between about 40° C and about 100° C.

2. A composition according to claim 1 wherein the various components are melt blended at a temperature of between about 150° C and about 200° C.

3. A composition according to claim 1 wherein the polyphenylene ether resin is poly (2,6-diemthyl-1,4-phenylene) ether.

4. A composition according to claim 1 wherein the monoalkenyl arene is styrene and the conjugated diene is selected from the group consisting of isoprene and butadiene.

5. A composition according to claim 4 wherein the number average molecular weight of the styrene blocks is between about 9,000 and about 25,000, and the number average molecular weight of the conjugated diene blocks is between about 25,000 and about 150,000.

6. A composition according to claim 4 wherein the block copolymer has the structure A—B—(B—A)$_n$, where n varies from 1 to 20.

7. A composition according to claim 1 wherein said block A - compatible resin is a coumarone-indene resin.

8. A composition according to claim 1 wherein said block A - compatible resin is a vinyltoluene-alphamethylstyrene copolymer.

9. A hot melt adhesive composition prepared by melt blending various components at a temperature of between 175° and 180° C and in the absence of a solvent wherein the various components consist of:
   a. 100 parts by weight of a block copolymer having at least two styrene polymer end blocks A and at least one isoprene midblock B, said blocks A comprising 8 – 55% by weight of the block copolymer;
   b. 125 parts by weight of a tackifying resin compatible with block B;
   c. 25 parts by weight of a hydrocarbon extending oil; and
   d. 35 parts by weight of a melt blend of
      (i) a low molecular weight poly(2,6 -dimethyl-1,4-phenylene) ether resin, and
      (ii) a coumarone-indene resin having a glass transition temperature of about 88° C, wherein the weight ratio of the polyphenylene ether resin to coumarone-indene resin is 25:75, the molecular weight ($M_{vis}$) of the polyphenylene ether resin is about 10,400 and its glass transition temperature is about 195° C.

* * * * *